(12) United States Patent
Carlsson et al.

(10) Patent No.: US 9,693,169 B1
(45) Date of Patent: Jun. 27, 2017

(54) ULTRASONIC SPEAKER ASSEMBLY WITH ULTRASONIC ROOM MAPPING

(71) Applicant: SONY CORPORATION, Tokyo (JP)

(72) Inventors: Gregory Carlsson, Santee, CA (US); Morio Usami, Fuchu (JP); Peter Shintani, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/072,098

(22) Filed: Mar. 16, 2016

(51) Int. Cl.
*H04S 7/00* (2006.01)
*G01S 15/08* (2006.01)

(52) U.S. Cl.
CPC .............. *H04S 7/301* (2013.01); *G01S 15/08* (2013.01); *H04R 2201/003* (2013.01)

(58) Field of Classification Search
CPC ...... H04S 7/307; H04S 7/301; H04S 2400/07; H04R 5/02
USPC ...................................... 381/300–310, 58–59
See application file for complete search history.

(56) References Cited

U.S. PATENT DOCUMENTS

| | | | |
|---|---|---|---|
| 4,332,979 A | 6/1982 | Fischer | |
| 6,008,777 A | 12/1999 | Yiu | |
| 6,128,318 A | 10/2000 | Sato | |
| 6,239,348 B1 | 5/2001 | Metcalf | |
| 6,329,908 B1 | 12/2001 | Frecska | |
| 6,611,678 B1 | 8/2003 | Zweig et al. | |
| 7,007,106 B1 | 2/2006 | Flood et al. | |
| 7,085,387 B1 | 8/2006 | Metcalf | |
| 7,146,011 B2 | 12/2006 | Yang et al. | |
| 7,191,023 B2 | 3/2007 | Williams | |
| 7,483,538 B2 | 1/2009 | McCarty et al. | |
| 7,483,958 B1 | 1/2009 | Elabbady et al. | |
| 7,492,913 B2 | 2/2009 | Connor et al. | |
| 7,689,613 B2 | 3/2010 | Candelore | |
| 7,760,891 B2 | 7/2010 | Biegelsen | |
| 7,792,311 B1 | 9/2010 | Holmgren et al. | |
| 7,822,835 B2 | 10/2010 | Atkinson et al. | |
| 7,853,022 B2 | 12/2010 | Thompson et al. | |
| 8,068,095 B2 | 11/2011 | Pryor | |
| 8,077,873 B2 | 12/2011 | Shridhar et al. | |
| 8,079,055 B2 | 12/2011 | Hardacker et al. | |
| 8,179,755 B2 | 5/2012 | Harris | |
| 8,199,941 B2 | 6/2012 | Hudson et al. | |
| 8,296,808 B2 | 10/2012 | Hardacker et al. | |
| 8,320,674 B2 | 11/2012 | Guillou et al. | |
| 8,345,883 B2 | 1/2013 | Takumai et al. | |

(Continued)

FOREIGN PATENT DOCUMENTS

JP 2005080227 A 3/2005
JP 2011004077 A 1/2011

(Continued)

OTHER PUBLICATIONS

"Method and System for Discovery and Configuration of Wi-Fi Speakers", http://ip.com/IPCOM/000220175; Dec. 31, 2008.

(Continued)

*Primary Examiner* — Melur Ramakrishnaiah
(74) *Attorney, Agent, or Firm* — John L. Rogitz

(57) ABSTRACT

Audio spatial effects are provided using ultrasonic speakers. To better reproduce the audio effects, ultrasound is used to map a room in which the speakers are disposed and the direction of emitted ultrasound from the speakers established using the map.

18 Claims, 8 Drawing Sheets

(56) References Cited

U.S. PATENT DOCUMENTS

| | | |
|---|---|---|
| 8,436,758 B2 | 5/2013 | McLaughlin et al. |
| 8,437,432 B2 | 5/2013 | McLaughlin et al. |
| 8,438,589 B2 | 5/2013 | Candelore |
| 8,509,463 B2 | 8/2013 | Goh et al. |
| 8,553,898 B2 | 10/2013 | Raftery |
| 8,614,668 B2 | 12/2013 | Pryor |
| 8,621,498 B2 | 12/2013 | Candelore |
| 8,629,942 B2 | 1/2014 | Candelore |
| 8,677,224 B2 | 3/2014 | McLaughlin et al. |
| 8,760,334 B2 | 6/2014 | McLaughlin et al. |
| 8,811,630 B2 | 8/2014 | Burlingame |
| 9,054,790 B2 | 6/2015 | McLaughlin et al. |
| 9,161,111 B2 | 10/2015 | Yuan et al. |
| 9,282,196 B1 | 3/2016 | Norris et al. |
| 9,300,419 B2 | 3/2016 | Knowles |
| 9,485,556 B1 | 11/2016 | List |
| 2001/0037499 A1 | 11/2001 | Turock et al. |
| 2002/0054206 A1 | 5/2002 | Allen |
| 2002/0122137 A1 | 9/2002 | Chen et al. |
| 2002/0136414 A1 | 9/2002 | Jordan et al. |
| 2003/0046685 A1 | 3/2003 | Srinivasan et al. |
| 2003/0099212 A1 | 5/2003 | Anjum et al. |
| 2003/0107677 A1 | 6/2003 | Lu et al. |
| 2003/0210337 A1 | 11/2003 | Hall |
| 2004/0030425 A1 | 2/2004 | Yeakel et al. |
| 2004/0068752 A1 | 4/2004 | Parker |
| 2004/0196140 A1 | 10/2004 | Sid |
| 2004/0208324 A1 | 10/2004 | Cheung et al. |
| 2004/0264704 A1 | 12/2004 | Huin et al. |
| 2005/0024324 A1 | 2/2005 | Tomasi et al. |
| 2005/0125820 A1 | 6/2005 | Nelson et al. |
| 2005/0177256 A1 | 8/2005 | Shintani et al. |
| 2006/0106620 A1 | 5/2006 | Thompson et al. |
| 2006/0195866 A1 | 8/2006 | Thukral |
| 2006/0285697 A1 | 12/2006 | Nishikawa et al. |
| 2007/0183618 A1 | 8/2007 | Ishii et al. |
| 2007/0211022 A1* | 9/2007 | Boillot .............. G06F 3/0325 345/156 |
| 2007/0226530 A1 | 9/2007 | Celinski et al. |
| 2007/0297519 A1 | 12/2007 | Thompson et al. |
| 2008/0002836 A1 | 1/2008 | Moeller et al. |
| 2008/0025535 A1 | 1/2008 | Rajapakse |
| 2008/0089268 A1 | 4/2008 | Kinder et al. |
| 2008/0141316 A1 | 6/2008 | Igoe et al. |
| 2008/0175397 A1 | 7/2008 | Holman |
| 2008/0207115 A1 | 8/2008 | Lee et al. |
| 2008/0253575 A1 | 10/2008 | Lorgeoux et al. |
| 2008/0259222 A1 | 10/2008 | Hardacker et al. |
| 2008/0279307 A1 | 11/2008 | Gaffney et al. |
| 2008/0279453 A1 | 11/2008 | Candelore |
| 2008/0304677 A1 | 12/2008 | Abolfathi et al. |
| 2008/0313670 A1 | 12/2008 | Ho et al. |
| 2009/0037951 A1 | 2/2009 | Candelore et al. |
| 2009/0041418 A1 | 2/2009 | Candelore et al. |
| 2009/0060204 A1 | 3/2009 | Reams et al. |
| 2009/0150569 A1 | 6/2009 | Kumar et al. |
| 2009/0172744 A1 | 7/2009 | Rothschild |
| 2009/0264114 A1 | 10/2009 | Virolainen et al. |
| 2009/0298420 A1 | 12/2009 | Haartsen et al. |
| 2009/0313675 A1 | 12/2009 | Howarter et al. |
| 2010/0220864 A1 | 9/2010 | Martin |
| 2010/0260348 A1 | 10/2010 | Bhow et al. |
| 2010/0316237 A1 | 12/2010 | Elberbaum |
| 2011/0091055 A1 | 4/2011 | LeBlanc |
| 2011/0157467 A1 | 6/2011 | McRae |
| 2011/0270428 A1 | 11/2011 | Tam |
| 2012/0011550 A1 | 1/2012 | Holland |
| 2012/0014524 A1 | 1/2012 | Vafiadis |
| 2012/0058727 A1 | 3/2012 | Cook et al. |
| 2012/0069868 A1 | 3/2012 | McLaughlin et al. |
| 2012/0070004 A1 | 3/2012 | LaBosco et al. |
| 2012/0087503 A1 | 4/2012 | Watson et al. |
| 2012/0114151 A1 | 5/2012 | Nguyen et al. |
| 2012/0117502 A1 | 5/2012 | Nguyen et al. |
| 2012/0120874 A1 | 5/2012 | McLaughlin et al. |
| 2012/0148075 A1 | 6/2012 | Goh et al. |
| 2012/0158972 A1 | 6/2012 | Gammill et al. |
| 2012/0174155 A1 | 7/2012 | Mowrey et al. |
| 2012/0177225 A1 | 7/2012 | Springfield et al. |
| 2012/0220224 A1 | 8/2012 | Walker |
| 2012/0254931 A1 | 10/2012 | Oztaskent et al. |
| 2012/0291072 A1 | 11/2012 | Maddison et al. |
| 2012/0314872 A1 | 12/2012 | Tan et al. |
| 2012/0320278 A1 | 12/2012 | Yoshitani et al. |
| 2013/0003822 A1 | 1/2013 | Margulis |
| 2013/0039514 A1 | 2/2013 | Knowles et al. |
| 2013/0042292 A1 | 2/2013 | Buff et al. |
| 2013/0051572 A1 | 2/2013 | Goh et al. |
| 2013/0052997 A1 | 2/2013 | Killick et al. |
| 2013/0055323 A1 | 2/2013 | Venkitaraman et al. |
| 2013/0077803 A1 | 3/2013 | Konno et al. |
| 2013/0109371 A1 | 5/2013 | Brogan et al. |
| 2013/0121515 A1 | 5/2013 | Hooley et al. |
| 2013/0156212 A1 | 6/2013 | Bjelosevic et al. |
| 2013/0191753 A1 | 7/2013 | Sugiyama et al. |
| 2013/0205319 A1 | 8/2013 | Sinha et al. |
| 2013/0210353 A1 | 8/2013 | Ling et al. |
| 2013/0223279 A1 | 8/2013 | Tinnakornsrisuphap et al. |
| 2013/0223660 A1 | 8/2013 | Olafsson et al. |
| 2013/0229577 A1 | 9/2013 | McRae |
| 2013/0237156 A1 | 9/2013 | Jung et al. |
| 2013/0238538 A1 | 9/2013 | Cook et al. |
| 2013/0249791 A1 | 9/2013 | Pryor |
| 2013/0272535 A1 | 10/2013 | Yuan et al. |
| 2013/0279888 A1 | 10/2013 | Zeng et al. |
| 2013/0298179 A1 | 11/2013 | Baum et al. |
| 2013/0305152 A1 | 11/2013 | Griffiths et al. |
| 2013/0309971 A1 | 11/2013 | Kiukkonen et al. |
| 2013/0310064 A1 | 11/2013 | Brachet et al. |
| 2013/0312018 A1 | 11/2013 | Elliott et al. |
| 2013/0317905 A1 | 11/2013 | Warner et al. |
| 2013/0321268 A1 | 12/2013 | Tuck et al. |
| 2013/0325396 A1 | 12/2013 | Yuen et al. |
| 2013/0325954 A1 | 12/2013 | Cupala et al. |
| 2013/0326552 A1 | 12/2013 | Adams |
| 2013/0332957 A1 | 12/2013 | Deweese et al. |
| 2014/0003623 A1 | 1/2014 | Lang |
| 2014/0003625 A1 | 1/2014 | Sheen et al. |
| 2014/0004934 A1 | 1/2014 | Peterson et al. |
| 2014/0009476 A1 | 1/2014 | Venkitaraman et al. |
| 2014/0011448 A1 | 1/2014 | Yang |
| 2014/0026193 A1 | 1/2014 | Saxman et al. |
| 2014/0064492 A1 | 3/2014 | Lakkundi et al. |
| 2014/0219483 A1 | 8/2014 | Hong |
| 2014/0254811 A1 | 9/2014 | Takeda et al. |
| 2014/0254829 A1 | 9/2014 | Wang et al. |
| 2014/0270306 A1 | 9/2014 | Luna et al. |
| 2014/0287806 A1* | 9/2014 | Balachandreswaran A63F 13/00 463/7 |
| 2014/0323036 A1 | 10/2014 | Daley et al. |
| 2014/0328485 A1 | 11/2014 | Saulters |
| 2014/0362995 A1 | 12/2014 | Backman et al. |
| 2015/0078595 A1 | 3/2015 | Shintani et al. |
| 2015/0104026 A1 | 4/2015 | Kappus et al. |
| 2015/0128194 A1 | 5/2015 | Kuang et al. |
| 2015/0195649 A1 | 7/2015 | Vogt |
| 2015/0199122 A1 | 7/2015 | Garmark et al. |
| 2015/0201295 A1 | 7/2015 | Lau et al. |
| 2015/0208187 A1 | 7/2015 | Carlsson et al. |
| 2015/0208190 A1 | 7/2015 | Hooks et al. |
| 2015/0215722 A1 | 7/2015 | Milne et al. |
| 2015/0215723 A1* | 7/2015 | Carlsson .............. H04S 7/307 381/307 |
| 2015/0228262 A1 | 8/2015 | Silfvast et al. |
| 2015/0245157 A1 | 8/2015 | Seefeldt |
| 2015/0271620 A1 | 9/2015 | Lando et al. |
| 2015/0304789 A1 | 10/2015 | Babayoff et al. |
| 2015/0341737 A1 | 11/2015 | Kallai et al. |
| 2015/0350804 A1 | 12/2015 | Crockett et al. |
| 2015/0358707 A1 | 12/2015 | Saijo et al. |
| 2015/0358768 A1 | 12/2015 | Luna et al. |
| 2015/0373449 A1 | 12/2015 | Jackson |
| 2015/0382129 A1 | 12/2015 | Florencio et al. |
| 2016/0174012 A1 | 6/2016 | Tan et al. |

(56) References Cited

U.S. PATENT DOCUMENTS

2016/0286330 A1  9/2016  Kofman et al.
2016/0350067 A1  12/2016  Sundaresan et al.
2016/0359512 A1  12/2016  Fathollahi et al.

FOREIGN PATENT DOCUMENTS

WO  2009002292 A1  12/2008
WO  2012164444 A1  12/2012

OTHER PUBLICATIONS

Frieder Ganz, Payam Barnaghi, Francois Carrez, Klaus Moessner, "Context-Aware Management for Sensor Networks", University of Surrey, Guildford, UK Publication, 2011.

Robert W. Reams, "N-Channel Rendering: Workable 3-D Audio for 4kTV", AES 135, New York City, 2013.

Sokratis Kartakis, Margherita Antona, Constantine Stephandis, "Control Smart Homes Easily with Simple Touch", University of Crete, Crete, GR, 2011.

Gregory Peter Carlsson, Steven Martin Richman, James R. Milne, "Distributed Wireless Speaker System", file history of related U.S. Appl. No. 14/158,396, filed Jan. 17, 2014.

James R. Milne, Gregory Peter Carlsson, Steven Martin Richman, Frederick J. Zustak, "Audio Speaker System with Virtual Music Performance", file history of related U.S. Appl. No. 14/163,415, filed Jan. 24, 2014.

Gregory Peter Carlsson, Keith Resch, Oscar Manuel Vega, "Networked Speaker System with Follow Me", file history of related U.S. Appl. No. 14/974,413, filed Dec. 18, 2015.

James R. Milne, Gregory Carlsson, "Centralized Wireless Speaker System", file history of related U.S. Appl. No. 15/019,111, filed Feb. 9, 2016.

James R. Milne, Gregory Carlsson, "Distributed Wireless Speaker System", file history of related U.S. Appl. No. 15/044,920, filed Feb. 16, 2016.

James R. Milne, Gregory Carlsson, Steven Richman, Frederick Zustak, "Wireless Speaker System", file history of related U.S. Appl. No. 15/044,981, filed Feb. 16, 2016.

Madoka Nakajima, Shinichiro Haruyama, "New indoor navigation system for visually impaired people using visible light communication", Eurasip Journal on Wireless Communications and Networking, Feb. 19, 2013.

Tianxing Li, Chuankai An, Zhao Tian, Andrew T. Campbell, Xia Zhou, "Human Sensing Using Visible Light Communication", Department of Computer Science, Dartmouth College, Hanover, NH, Sep. 2015.

James R. Milne, Gregory Peter Carlsson, "Networked Speaker System with LED-Based Wireless Communication and Room Mapping", file history of related U.S. Appl. No. 15/298,470, filed Oct. 20, 2016.

James R. Milne, Gregory Peter Carlsson, "Networked Speaker System with LED-Based Wireless Communication and Object Detection", file history of related U.S. Appl. No. 15/298,591, filed Oct. 20, 2016.

James R. Milne, Gregory Peter Carlsson, "Networked Speaker System with LED-Based Wireless Communication and Personal Identifier", file history of related U.S. Appl. No. 15/298,649, filed Oct. 20, 2016.

Gregory Peter Carlsson, Keith Resch, Oscar Manuel Vega, "Networked Speaker System with Follow Me", related U.S. Appl. No. 14/974,413, Final Office Action dated Nov. 28, 2016.

James R. Milne, Gregory Carlsson, Steven Richman, Frederick Zustak, "Wireless Speaker System", related U.S. Appl. No. 15/044,981, Non-Final Office Action dated Nov. 28, 2016.

Peter Shintani, Gregory Carlsson, "Gimbal-Mounted Linear Ultrasonic Speaker Assembly", file history of related U.S. Appl. No. 15/068,806, filed Mar. 14, 2016.

"Ack Pro Mid-Sized Ball Bearing Brushless Gimbal With Turnigy 4006 Motors", Hobbyking.com, Retrieved on Nov. 27, 2015 from http://www.hobbyking/store/_51513_ACK_Pro_Mid_Sized_ Ball_Bearing_Brushless_Gimbal_With_Turnigy_4008_Motors_NEX5_and_GF.html.

Patrick Lazik, Niranjini Rajagopal, Oliver Shih, Bruno Sunopoli, Anthony Rowe, "ALPS: A Bluetooh and Ultrasound Platform for Mapping and Localization". Dec. 4, 2015, Carnegie Mellon University.

Santiago Elvira, Angel De Castrao, Javier Garrido, "ALO4: Angle Localization and Orientation System with Four Receivers", Jun. 27, 2014, International Journal of Advanced Robotic Systems.

Woon-Seng Gan, Ee-Leng Tan, Sen M. Kuo, "Audio ProjectionL Directional Sound and its Applications in Immersive Communication", 2011, IEEE Signal Processing Magazine, 28(1), 43-57.

Gregory Carlsson, Masaomi Nishidate, Morio Usami, Kiyoto Shibuya, Norihiro Nagai, Peter Shintani, "Ultrasonic Speaker Assembly for Audio Spatial Effect", file history of related U.S. Appl. No. 15/018,128, filed Feb. 8, 2016.

Gregory Carlsson, Masaomi Nishidate, Morio Usami, Kiyoto Shibuya, Norihiro Nagai, Peter Shintani, "Gimbal-Mounted Ultrasonic Speaker for Audio Spatial Effect", file history of related U.S. Appl. No. 14/968,649, filed Dec. 14, 2015.

Peter Shintani, Gregory Carlsson, "Ultrasonic Speaker Assembly Using Variable Carrier Frequency to Establish Third Dimension Sound Locating", file history of related U.S. Appl. No. 15/214,748, filed Jul. 20, 2016.

James R. Milne, Gregory Peter Carlsson, Steven Martin Richman, Frederick J. Zustak, "Audio Speaker System With Virtual Music Performance", related U.S. Appl. No. 14/163,415, Non-Final Office Action dated Jan. 13, 2017.

James R. Milne, Gregory Peter Carlsson, Steven Martin Richman, Frederick J. Zustak, "Audio Speaker System With Virtual Music Performance", related U.S. Appl. No. 14/163,415, Applicant's response to Non-Final Office Action filed Jan. 17, 2017.

Gregory Peter Carlsson, Keith Resch, Oscar Manuel Vega, "Networked Speaker System with Follow Me", related U.S. Appl. No. 14/974,413, Applicant's response to Non-Final Office Action filed Jan. 5, 2017.

Gregory Carlsson, Masaomi Nishidate, Morio Usami, Kiyoto Shibuya, Norihiro Nagai, Peter Shintani, "Ultrasonic Speaker Assembly for Audio Spatial Effect", related U.S. Appl. No. 15/018,128, Non-Final Office Action dated Jan. 17, 2017.

Gregory Carlsson, Masaomi Nishidate, Morio Usami, Kiyoto Shibuya, Norihiro Nagai, Peter Shintani, "Ultrasonic Speaker Assembly for Audio Spatial Effect", related U.S. Appl. No. 15/018,128, Applicant's response to Non-Final Office Action filed Jan. 18, 2017.

James R. Milne, Gregory Carlsson, "Distributed Wireless Speaker System", related U.S. Appl. No. 15/044,920, Non-Final Office Action dated Jan. 13, 2017.

James R. Milne, Gregory Carlsson, "Distributed Wireless Speaker System", related U.S. Appl. No. 15/044,920, Applicant's response to Non-Final Office Action filed Jan. 17, 2017.

Gregory Peter Carlsson, Keith Resch, Oscar Manuel Vega, "Networked Speaker System with Follow Me", related U.S. Appl. No. 14/974,413, Applicant's response to Final Office Action filed Dec. 2, 2016.

Gregory Peter Carlsson, Keith Resch, Oscar Manuel Vega, "Networked Speaker System with Follow Me", related U.S. Appl. No. 14/974,413, Non-Final Office Action dated Dec. 21, 2016.

James R. Milne, Gregory Carlsson, Steven Richman, Frederick Zustak, "Wireless Speaker System", related U.S. Appl. No. 15/044,981, Applicants response to Non-Final Office Action filed Dec. 14, 2016.

James R. Milne, Gregory Carlsson, "Centralized Wireless Speaker System", related U.S. Appl. No. 15/019,111, Non-Final Office Action dated Jan. 20, 2017.

James R. Milne, Gregory Carlsson, "Centralized Wireless Speaker System", related U.S. Appl. No. 15/019,111, Applicant's response to Non-Final Office Action filed Jan. 25, 2017.

(56) References Cited

OTHER PUBLICATIONS

Gregory Peter Carlsson, Keith Resch, Oscar Manuel Vega, "Networked Speaker System With Follow Me", related U.S. Appl. No. 14/974,413, Final Office Action dated Feb. 21, 2017.

* cited by examiner

Control Signal Source

Gimbal Assembly

Control Signal Source

ULTRASONIC SPEAKER ASSEMBLY WITH ULTRASONIC ROOM MAPPING

FIELD

The application relates generally to ultrasonic speaker assemblies for producing audio.

BACKGROUND

Audio spatial effects to model the movement of a sound-emitting video object as if the object were in the space which the video is being displayed are typically provided using phased-array principles. As understood herein, such systems may not as accurately and precisely model audio spatial effects or be as compact as is possible using present principles.

SUMMARY

A system includes at least one ultrasonic speaker configured to emit sound along a respective sonic axis, at least one microphone, and at least one computer memory that is not a transitory signal and that includes instructions executable by at least one processor to generate, using the at least one ultrasonic speaker and the at least one microphone, a map of a room. The instructions are executable to receive a control signal, and responsive to the control signal, actuate a speaker at least in part using the map of the room.

The apparatus may include the processor. The speaker that is actuated responsive to the control signal using the map of the room may be the ultrasonic speaker used to generate the map, or it may be another speaker.

In example embodiments, the control signal can indicate a demanded sonic axis including an elevation component and an azimuth component. In some implementations, the control signal may be received from a computer game console outputting a main audio channel for playing on non-ultrasonic speakers. In examples, the instructions can be executable to, using the map, direct sound at a reflection location responsive to the control signal.

In non-limiting embodiments the control signal represents at least one audio effect data in a received audio channel. The audio effect data may be established at least in part from input to a computer game input device.

In another aspect, a method includes orienting at least one ultrasonic (US) speaker in azimuth and elevation at an $i^{th}$ orientation, causing the US speaker to emit a mapping sound at a time "i", and detecting a return signal of the mapping sound using at least one microphone. The method also includes determining a time difference $\Delta t$ between time of return signal detection and the time "i" and converting the time difference $\Delta t$ to an $i^{th}$ distance using:

$i^{th}$ distance=½$\Delta t$*c, wherein c=speed of sound.

Also, the method includes establishing a location of a surface to be a distance equal to the $i^{th}$ distance associated with the $i^{th}$ orientation. Based at least in part on the location of the surface and responsive to a control signal for a demanded audio effect, an orientation is established for at least one US speaker at which the at least one US speaker is to emit the demanded audio.

In another aspect, a device includes at least one computer memory that is not a transitory signal and that in turn includes instructions executable by at least one processor to generate, using at least one ultrasonic (US) speaker and the at least one microphone, a map of a room. This is accomplished at least in part by orienting the at least one US speaker in azimuth and elevation at an $i^{th}$ orientation and causing the US speaker to emit a mapping sound at a transmission time. At a return signal time, a return signal of the mapping sound is detected using the at least one microphone such that an $i^{th}$ distance can be determined using return signal time and the transmission time. A location of a surface of the room is established to be a distance equal to the $i^{th}$ distance associated with the $i^{th}$ orientation.

The details of the present application, both as to its structure and operation, can best be understood in reference to the accompanying drawings, in which like reference numerals refer to like parts, and in which:

DETAILED DESCRIPTION

Figure 1:
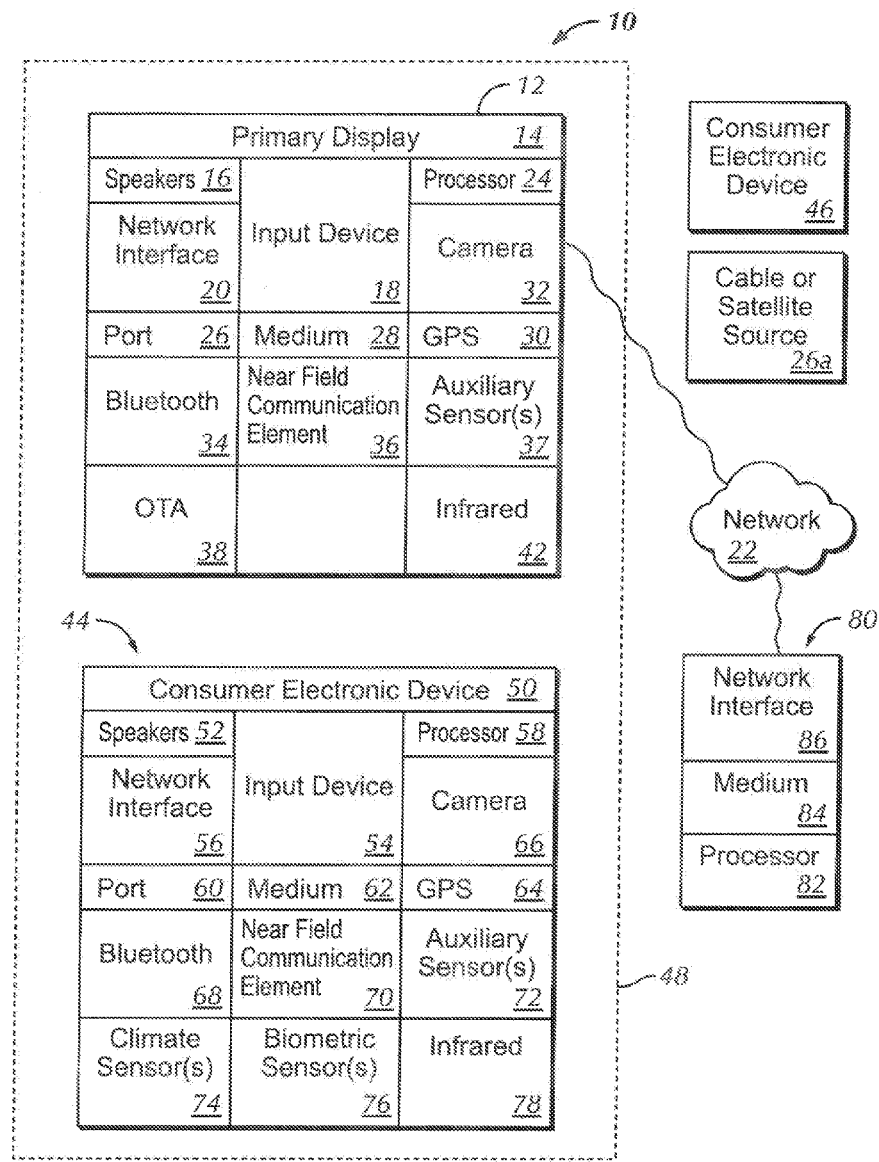
FIG. 1 is a block diagram of an example system including an example system in accordance with present principles.

This disclosure relates generally to computer ecosystems including aspects of consumer electronics (CE) device networks. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can he implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). However, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, game console, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may be touch-enabled for receiving user input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless a telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below.

The AVDD 12 may further include one or more computer memories 28 such as disk-based or solid state storage that are not transitory signals, in some cases embodied in the chassis of the AVDD as standalone devices or as a personal video recording device (PVR) or video disk player either internal or external to the chassis of the AVDD for playing back AV programs or as removable memory media. Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVDD 12 may include an over-the-air TV broadcast port 38 for receiving OTH TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. When the system 10 is a home network, communication between components may be according to the digital living network alliance (DLNA) protocol.

In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller, and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVDD 12, or it may be a more sophisticated device such as a tablet computer, a game controller communicating via wired or wireless link with a game console implemented by the second CE device 46 and controlling video game presentation on the AVDD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 42 such as an IR data association (IRDA) device. A battery (not shown) may be provided for powering the first CE device 44. The CE device 44 may communicate with the AVDD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
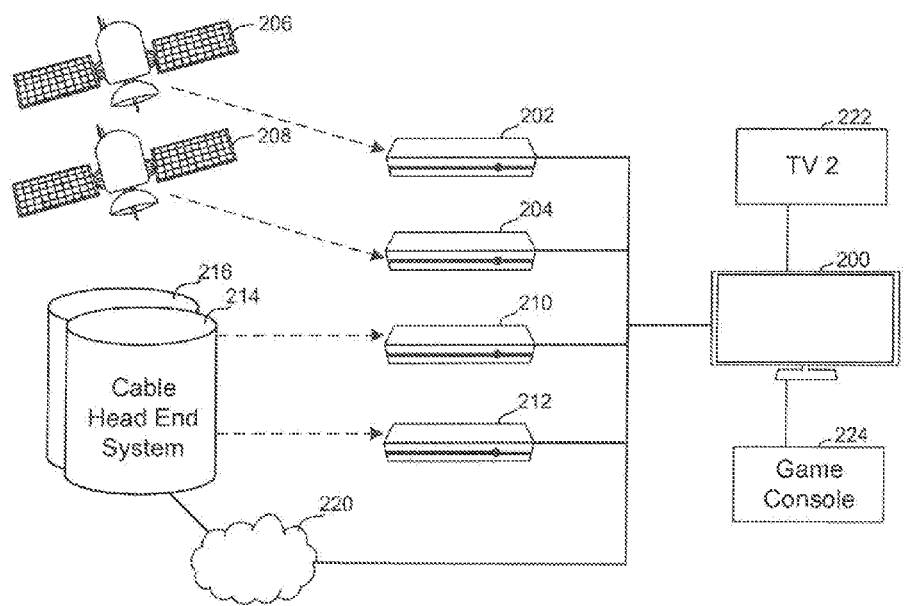
FIG. 2 is a block diagram of another system that can use the components of FIG. 1.

Now referring to FIG. 2, an AVDD 200 that may incorporate some or all of the components of the AVDD 12 in FIG. 1 is connected to at least one gateway for receiving content, e.g., UHD content such as 4K or 8K content, from the gateway. In the example shown, the AVDD 200 is connected to first and second satellite gateways 202, 204, each of which may be configured as a satellite TV set top box for receiving satellite TV signals from respective satellite systems 206, 208 of respective satellite TV providers.

In addition or in lieu of satellite gateways, the AVDD 200 may receive content from one or more cable TV set top box-type gateways 210, 212, each of which receives content from a respective cable head end 214, 216.

Yet again, instead of set-top box like gateways, the AVDD 200 may receive content from a cloud-based gateway 220. The cloud-based gateway 220 may reside in a network interface device that is local to the AVDD 200 (e.g., a modem of the AVDD 200) or it may reside in a remote Internet server that sends Internet-sourced content to the AVDD 200. In any case, the AVDD 200 may receive multimedia content such as UHD content from the Internet through the cloud-based gateway 220. The gateways are computerized and thus may include appropriate components of any of the CE devices shown in FIG. 1.

In some embodiments, only a single set top box-type gateway may be provided using, e.g., the present assignee's remote viewing user interface (RVU) technology.

Tertiary devices may be connected, e.g., via Ethernet or universal serial bus (USB) or WiFi or other wired or wireless protocol to the AVDD 200 in a home network (that may be a mesh-type network) to receive content from the AVDD 200 according to principles herein. In the non-limiting example shown, a second TV 222 is connected to the AVDD 200 to receive content therefrom, as is a video game console 224. Additional devices may be connected to one or more tertiary devices to expand the network. The tertiary devices may include appropriate components of any of the CE devices shown in FIG. 1.

Figure 3:
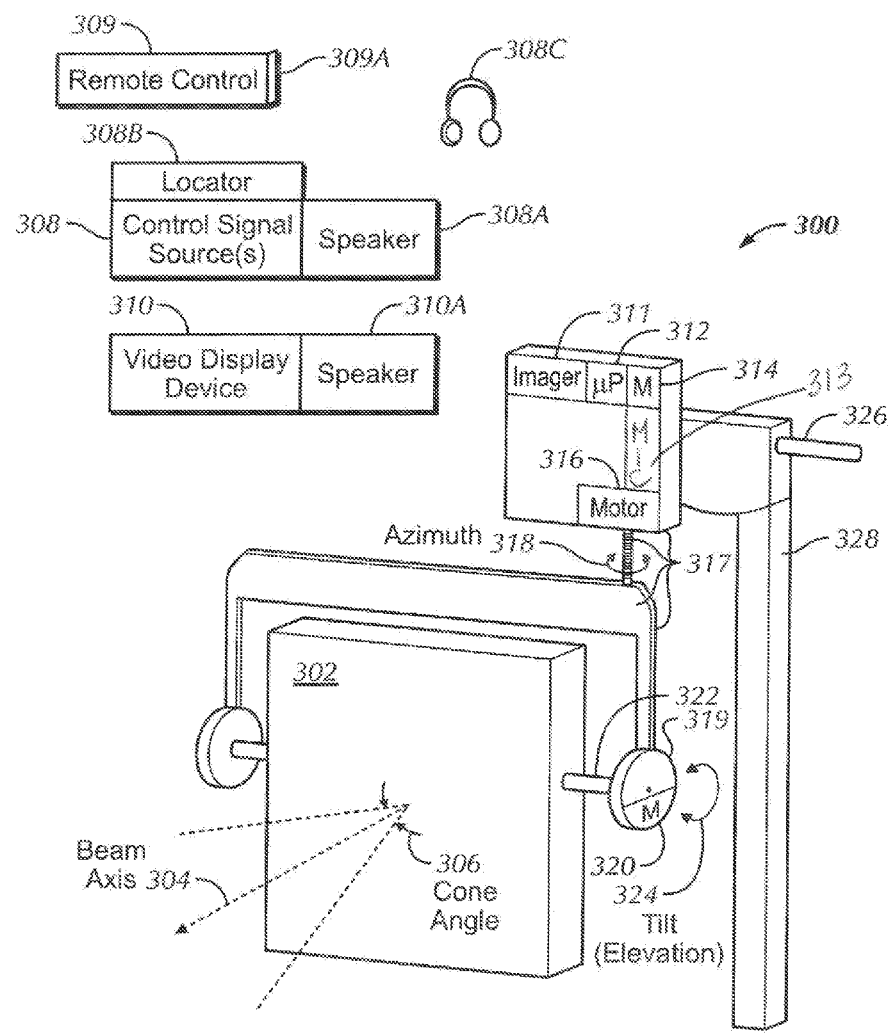
FIG. 3 is a schematic diagram of an example ultrasonic speaker system mounted on a gimbal assembly.

In the example system of FIG. 3, the control signal may come from a game console implementing some or all of the components of the CE device 44, or from a camera such as one of the cameras discussed herein, and the gimbal assembly may include, in addition to the described mechanical parts, one or more the components of the second CE device 46. The game console may output video on the AVDD. Two or more of the components of the system may be consolidated into a single unit.

With greater specificity, a system 300 in FIG. 3 includes an ultrasonic speaker 302 (also known as a "parametric emitter") that emits sound along a sonic axis 304. Only a single speaker on the gimbal may be used or, as disclosed in the alternate embodiment below, multiple US speakers, e.g., arranged in a spherical assembly. The speaker or speakers may be mounted on the gimbal assembly. The sound beam is typically confined to relatively narrow cone defining a cone angle 306 about the axis 304 typically of a few degrees up to, e.g., thirty degrees. Thus, the speaker 302 is a directional sound source that produces a narrow beam of sound by modulating an audio signal onto one or more ultrasonic carrier frequencies. The highly directional nature of the ultrasonic speaker allows the targeted listener to hear the sound clearly, while another listener in the same area, but outside of the beam hears very little of the sound.

As mentioned above, a control signal for moving the speaker 302 may be generated by, in examples, one or more control signal sources 308 such as cameras, game consoles, personal computers, and video players in, e.g., a home entertainment system that output related video on a video display device 310. By this means, sound effects such as a vehicle (plane, helicopter, car) moving through a space can be achieved with a great degree of accuracy using only a single speaker as a sound source.

In an example, the control signal source 308 such as a game controller may output the main audio on a main, or non-ultrasonic speaker(s) 308A or 310A of, e.g., a video display device such as a TV or PC or associated home sound system that the game is being presented on. A separate sound effect audio channel may be included in the game, and this second sound effect audio channel is provided to the US speaker 300 along with or as part of the control signal sent to move the gimbal assembly, for playing the sound effect channel on the directional US speaker 300 while the main audio of the game is simultaneously played on the speaker(s) 308A/310A.

The control signal source 308 may receive user input from one or more remote controllers (RC) 309 such as computer game RCs. The RC 309 and/or sound headphone 308C provided for each game player for playing the main (non-US) audio may have a locator tag 309A appended to it such as an ultra-wide band (UWB) tag by which the location of the RC and/or headphones can be determined. In this way, since the game software knows which headphones/RC each player has, it can know the location of that player to aim the US speaker at for playing US audio effects intended for that player.

Instead of UWB, other sensing technology that can be used with triangulation to determine the location of the RC may be used, e.g., accurate Bluetooth or WiFi or even as separate GPS receiver. When imaging is to be used to determine the location of the user/RC and/or room dimensions as described further below, the control signal source 308 may include a locator 308B such as a camera (e.g., a CCD) or a forward looking infrared (FLIR) imager.

User location may be determined during an initial auto calibration process. Another example of such a process is as follows. The microphone in the head set of the game player can be used or alternatively a microphone incorporated into the ear pieces of the headset or the earpiece itself could be used as a microphone. The system can precisely calibrate the location of each ear by moving the US beam around until a listener wearing the headphones indicates, e.g., using a predetermined gesture, which ear is picking up the narrow US beam.

In addition or alternatively the gimbal assembly may be coupled to a camera or FLIR imager 311 which sends signals to one or more processors 312 receiving information pertaining to received sound from one or more microphones 313 such as a micro electric-mechanical system (MEMS) microphone and accessing one or more computer memories 314 in a gimbal assembly. The control signal (along with, if desired, the sound effect audio channel) is also received (typically through a network interface) by processor. The gimbal assembly may include an azimuth control motor 316 controlled by the processor 312 to turn a support assembly 317 on which the speaker 302 is mounted in an azimuthal dimension 318 as shown.

If desired, not only the azimuth of the sonic beam 304 but also its elevation angle with respect to the horizontal plane may be controlled. In the example shown, the support assembly 317 includes opposed side mounts 319, and an elevation control motor 320 may be coupled to a side mount 319 to rotate an axle 322 coupled to the speaker 302 to tilt the speaker up and down in elevation angle, as indicated at 324. The gimbal assembly may include a horizontal support arm 326 coupled to a vertical support pole 328 in non-limiting examples.

The gimbal assembly and/or portions thereof may be a brushless gimbal assembly available from Hobby King.

Figure 4:
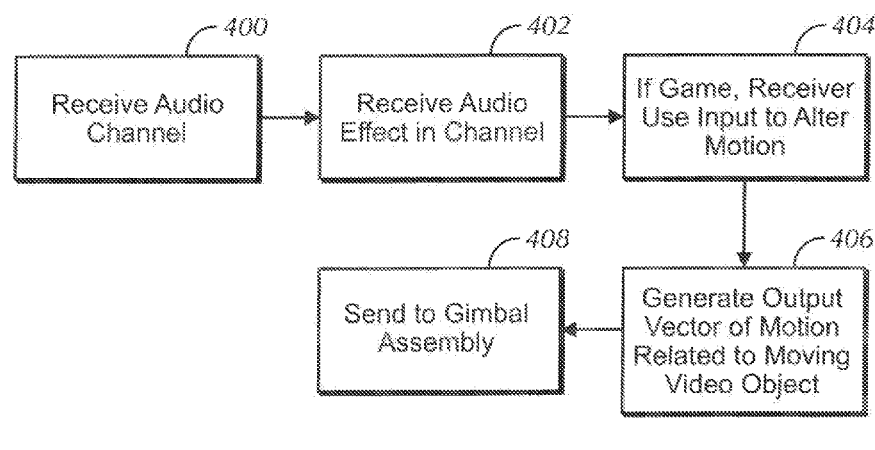
FIGS. 4 and 5 are flow charts of example logic attendant to the system in FIG. 3.

Turning to FIG. 4 for a first example, a computer game designer may designate an audio effects channel in addition to a main audio channel which is received at block 400 to specify a location (azimuth and, if desired, elevation angle) of the audio effects carried in the audio effects channel and received at block 402. This channel typically is included in the game software (or audio-video movie, etc.). When the control signal for the audio effects is from a computer game software, user input to alter motion of an object represented by the audio effects during the game (position, orientation) may be received from the RC 309 at block 404. At block 406 the game software generates and outputs a vector (x-y-z) defining the position of the effect over time (motion) within the environment. This vector is sent to the gimbal assembly at block 408 such that the ultrasonic speaker(s) 300 of the gimbal assembly plays back the audio effect channel audio and uses the vector to move the speaker 302 (and, hence, the sonic axis 304 of the emitted audio effect).

Figure 5:
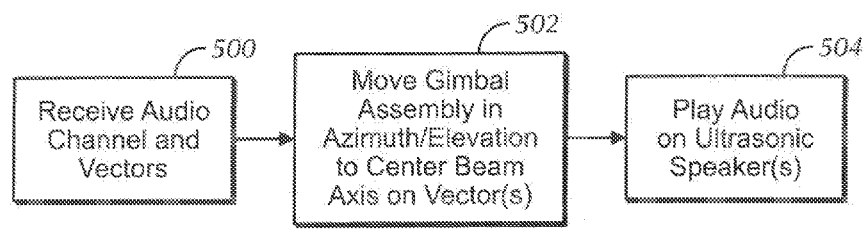

FIG. 5 illustrates what the gimbal assembly does with the control signal. At block 500 the audio channel with directional vector(s) is received. Proceeding to block 502, the gimbal assembly is moved to move the speaker 302 in azimuth and/or elevation angle to center the sonic axis 304 in the demanded vector. The demanded audio is played on the speaker at block 504, confined within the cone angle 306.

Figure 6:
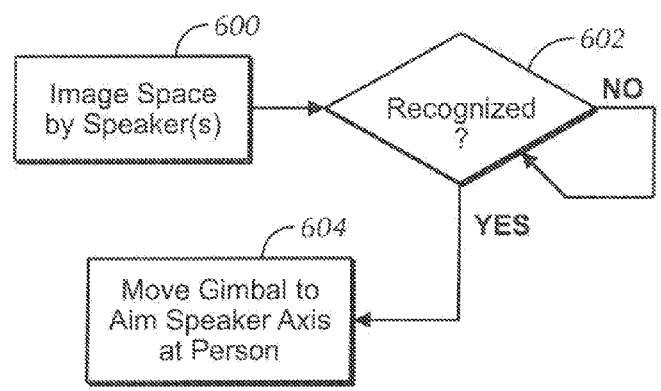
FIG. 6 is a flow chart of example alternate logic for directing the sonic beam toward a particular viewer.

As alluded to above, a camera such as the one shown in FIG. 1 may be used to image a space in which the speaker 302 is located at block 600 of FIG. 6, representing logic that may be employed by the processor of the gimbal assembly, for example. While the camera in FIG. 1 is shown coupled to an audio video display device, it may alternatively be the locator 308B provided on the game console serving as the control signal generator 308 or the imager 311 on the gimbal assembly itself. In any case, it is determined at decision diamond 602, using face recognition software operating on a visible image from, e.g., the locator 308B or imager 311, whether a predetermined person is in the space by, e.g., matching an image of the person against a stored template image, or by determining, when FLIR is used, whether an IR signature matching a predetermined template has been received. If a predetermined person is imaged, the gimbal assembly may be moved at block 604 to aim the sonic axis 304 at the recognized person.

To know where the imaged face of the predetermined person is, one of several approaches may be employed. A first approach is to instruct the person using an audio or video prompt to make a gesture such as a thumbs up or to hold up the RC in a predetermined position when the person hears audio, and then move the gimbal assembly to sweep the sonic axis around the room until the camera images the person making the gesture. Another approach is to preprogram the orientation of the camera axis into the gimbal assembly so that the gimbal assembly, knowing the central camera axis, can determine any offset from the axis at which the face is imaged and match the speaker orientation to that offset. Still further, the camera 311 itself may be mounted on the gimbal assembly in a fixed relationship with the sonic axis 304 of the speaker 302, so that the camera axis and sonic axis always match. The signal from the camera can be used to center the camera axis (and hence sonic axis) on the imaged face of the predetermined person.

Figure 7:
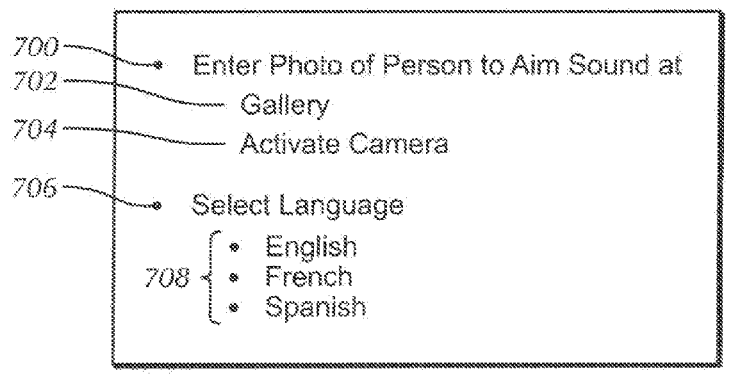
FIG. 7 is an example screen shot for inputting a template for the logic of FIG. 6 to employ.

FIG. 7 presents an example user interface (UI) that may be used to enter the template used at decision diamond 602 in FIG. 6. A prompt 700 can be presented on a display such as a video display to which a game controller is coupled for a person to enter a photo of a person at whom the sonic axis should be aimed. For instance, a person with sight and/or hearing disabilities may be designated as the person at whom to aim the speaker 302.

The user may be given an option 702 to enter a photo in a gallery, or an option 704 to cause the camera to image a person currently in front of the camera. Other example means for entering the test template for FIG. 6 may be used. For example, the system may be notified by direct user input where to aim the sonic axis 304 of the speaker 302.

In any case, it may be understood that present principles may be used to deliver video description audio service to a specific location where the person who has a visual disability may be seated.

Another characteristic of the ultrasonic speaker is that if aimed at a reflective surface such as a wall, the sound appears to come from the location of the reflection. This characteristic may be used as input to the gimbal assembly to control the direction of the sound using an appropriate angle of incidence off the room boundary to target the reflected sound at the user. Range finding technology may be used to map the boundaries of the space. Being able to determine objects in the room, such as curtains, furniture, etc. aids in the accuracy of the system. The addition of a camera, used to map or otherwise analyze the space in which the effects speaker resides can be used to modify the control signal in a way that improves the accuracy of the effects by taking the environment into account.

With greater specificity, the room may be imaged by any of the cameras above and image recognition implemented to determine where the walls and ceiling are. Image recognition can also indicate whether a surface is a good reflector, e.g., a flat white surface typically is a wall that reflects well, while a folded surface may indicate a relatively non-reflective curtain. A default room configuration (and if desired default locations assumed for the listener(s)) may be provided and modified using the image recognition technology.

Alternatively and as described further below in reference to FIG. 11, the directional sound from the US speaker 300 may be used by moving the gimbal assembly, emitting chirps at each of various gimbal assembly orientations, and timing reception of the chirps, to know (1) the distance to the reflective surface in that direction and (2) based on the amplitude of the return chirp, whether the surface is a good or poor reflector. Yet again, white noise may be generated as a pseudorandom (PN) sequence and entitled by the US speaker and reflections then measured to determine the transfer function of US waves for each direction in which the "test" white noise is emitted. Yet further, the user may be prompted through a series of UIs to enter room dimensions and surface types.

Still again, one or more of the room dimension mapping techniques described in USPP 2015/0256954, incorporated herein by reference, may be used.

Or, structured light could be employed to map a room in 3D for more accuracy. Another way to check the room, is the use an optical pointer (known divergence), and with a camera, it can accurately measure the room dimensions. By the spot dimensions, and distortions, the angle of incidence on a surface can be estimated. Also the reflectivity of the surface is an additional hint as to whether it may or may not be a reflective surface for sound.

In any case, once the room dimensions and surface types are known, the processor of the gimbal assembly, knowing, from the control signal, the location at which audio effects are modeled to come and/or be delivered to, can through triangulation determine a reflection location at which to aim the US speaker 300 so that the reflected sound from the reflection location is received at the intended location in the room. In this manner the US speaker 300 may not be aimed by the gimbal assembly directly at the intended player but instead may be aimed at the reflection point, to give the intended player the perception that the sound is coming from the reflection point and not the direction of the US speaker.

FIG. 7 illustrates a further application, in which multiple ultrasonic speakers on one or more gimbal assemblies provide the same audio but in respective different language audio tracks such as English and French simultaneously as the audio is targeted. A prompt 706 can be presided to select the language for the person whose facial image establishes the entered template. The language may be selected from a list 708 of languages and correlated to the person's template image, such that during subsequent operation, when a predetermined face is recognized at decision diamond 602 in FIG. 6, the system knows which language should be directed to each user. Note that while the gimbal-mounted ultrasonic speaker precludes the need for phased array technology, such technology may be combined with present principles.

Figure 8:
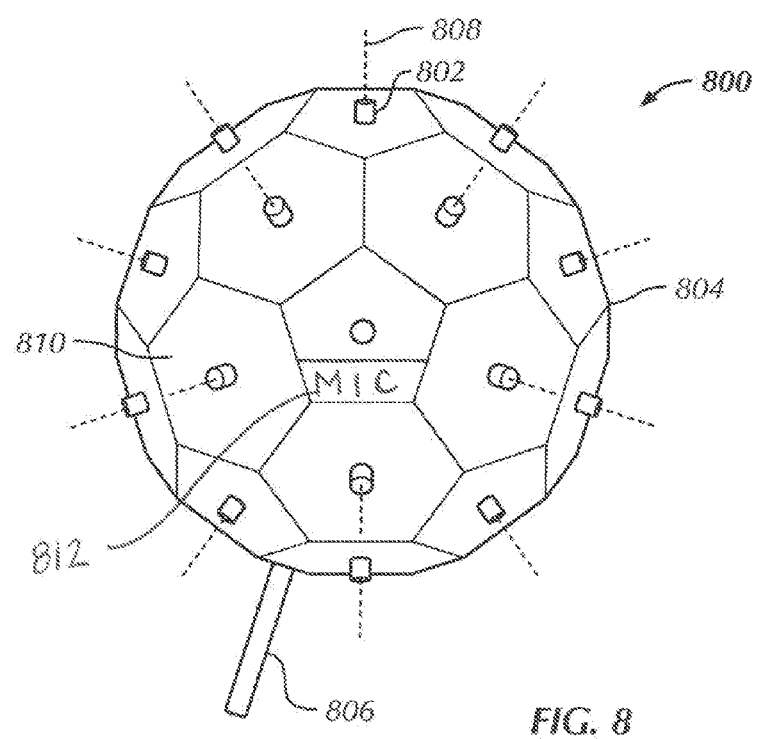
FIG. 8 shows an alternate speaker assembly in which ultrasonic speakers are arranged on a spherical support that need not be moved.

FIG. 8 shows an alternate speaker assembly 800 in which plural ultrasonic speakers 802 are mounted on a speaker mount 804 that can be supported on a stanchion-like support 806. Each speaker 802 emits sound along a respective sonic axis 808 that, in spherical coordinates, has an elevation component and an azimuth component. If desired, the very top-most portion and/or very bottom-most portion of the mount 804 need not support any speakers, i.e., if desired a speaker pointing straight or straight down need not be provided on the mount 804. The elevational "dead zone" may be extended if desired if nearly vertical sound projection is not envisioned, so that, for instance, no speaker need be provided whose sonic axis has an elevation angle within "N" degrees of vertical.

In any case, the mount may be configured to hold the speakers 802 in the spherical-like arrangement shown, so that each sonic axis 808, if extended into the mount 804, approximately intersects the center of the mount 804. In the example shown, the mount 804 is configured as a Bucky Ball, with panels 810 that may be flat and that may support, substantially in the center of the panel, a respective speaker 802 as shown. Each speaker 802 may be oriented substantially along a radial line defined by the Bucky Ball.

One or more microphones 812 such as a micro electric-mechanical system (MEMS) microphone may be included in the system of FIG. 8, e.g., by mounting the microphone on a Bucky ball panel, for purposes to be disclosed in relation to FIG. 11 described below.

The speakers 802 may be received in respective holes in their respective panels 810 to support the speakers 802 on the mount 804. The speakers may be epoxied or otherwise further bonded to the mount. Other mounting means are envisioned, including attaching the speakers to the mount using fasteners such as screws, or magnetically coupling the speakers to the mount, etc. The relevant components from the gimbal embodiment shown in FIG. 3, including the imager 311, processor 312, and memory 314 may be supported on or within the mount 804. Thus, the logic of FIGS. 4-6 can be performed by the assembly in FIG. 8 with the exceptions below in reference to FIGS. 9 and 10 that instead of moving a gimbal to align a sonic axis with a demanded direction in the control signal, the speaker 802 with the sonic axis 808 most closely matching the demanded axis is activated to play the demanded audio. Note that when multiple channels of demanded audio are present, each channel can be played on a respective one of the speakers simultaneously with the other channel on another speaker. In this way, multiple audio sound effects can be played simultaneously with each sound effect channel being played in a direction different from the direction in which the other sound effect channel(s) is played.

In the embodiment of FIG. 8, the mount 804 need not be movable on the stanchion 806. Instead, the above-described control signal, which essentially establishes a demanded axis, can dictate the selection of which speaker 804 is activated or actuated to emit sound along its respective sonic axis 808. That is, the speaker 802 with the sonic axis 808 most closely matching the demanded sonic axis is selected to output the demanded audio effect. One and only one speaker 802 at a time need be activated, although if desired more than one speaker 802 can be activated at one time when, for example, multiple demanded sonic axes for the demanded audio effect channel are simultaneously generated.

It is to be understood that all other relevant principles from the descriptions of FIGS. 1-7 apply to the alternate embodiment of FIG. 8.

Figure 9:
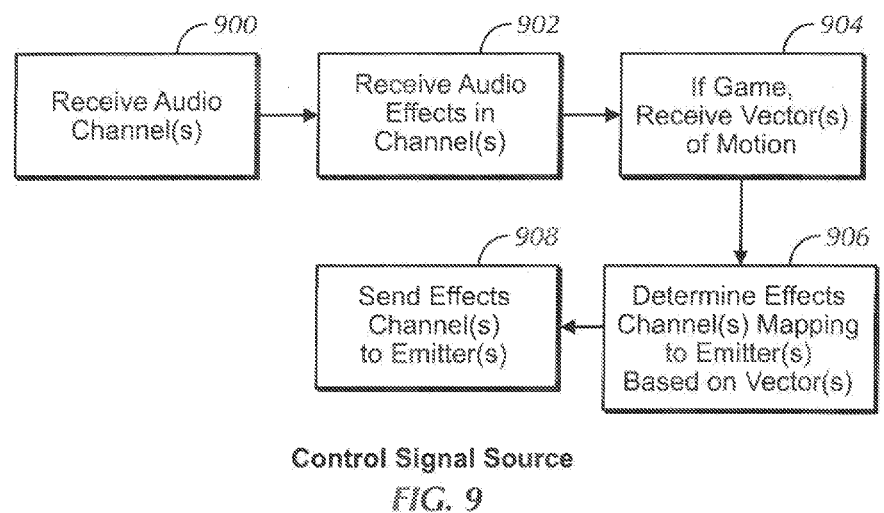
FIGS. 9 and 10 are flow charts of example logic attendant to the system in FIG. 8.
Figure 10:
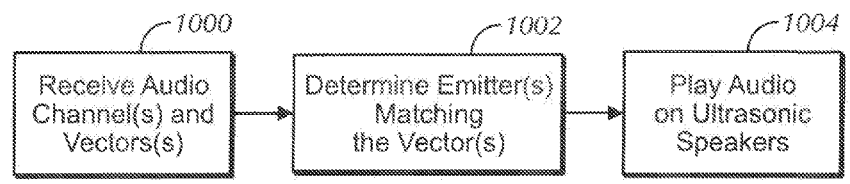

With even greater specificity and turning now to FIGS. 9 and 10, an audio effects channel is received at block 900 to specify a location (azimuth and, if desired, elevation angle) of the audio effects carried in the audio effects channel and received at block 902. This channel typically is included in the game software (or audio-video movie, etc.). When the control signal for the audio effects is from a computer game software, user input to alter motion of an object represented by the audio effects during the game (position, orientation) may be received from the RC 309 at block 904. At block 906 the game software generates and outputs a vector (x-y-z)

defining the position of the effect over time (motion) within the environment. This vector is sent to the speaker ball processor(s) at block 908 such that the ultrasonic speaker(s) of the assembly plays back the audio effect channel audio, with the playing speaker being the one that emits sound as demanded by the vector(s) at block 906.

FIG. 10 illustrates what the speaker ball assembly does with the control signal. At block 1000 the audio channel with directional vector(s) is received. Proceeding to block 1002, the speaker(s) which emits sound in a direction satisfying the demanded vector is selected. The demanded audio is played on the selected speaker at block 1004.

The logic of FIG. 6 described above may also be employed with the speaker assembly of FIG. 8, with the exception that at block 604, responsive to a predetermined person is imaged, the speaker is selected to play audio along an axis satisfying the demanded vector, in this case, the speaker whose sonic axis is pointed at the recognized person.

Figure 11:
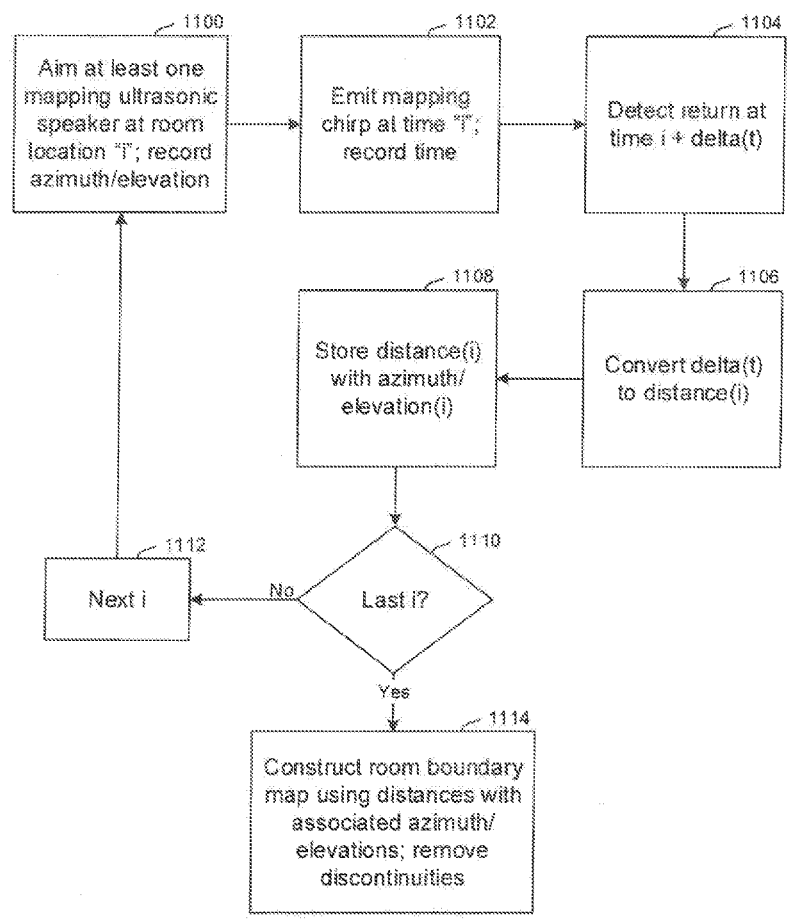
FIG. 11 is a flow chart of example logic for mapping a room ultrasonically.

FIG. 11 illustrates logic for mapping a room in which any of the US speaker assemblies described above may be disposed using, e.g., the MEMS microphones 313, 812 of FIGS. 3 and 8. Commencing at block 1100, at least one of the US speakers is oriented in azimuth and elevation at an $i^{th}$ orientation. The orientation of the speaker is recorded. Proceeding to block 1102, the speaker is controlled to emit a mapping sound or chirp at time "i". The time "i" is recorded. If desired, multiple speakers in respective orientations may emit respective test chirps at respective different frequencies at time "i", with the differences in frequencies of the return reflections being used to discriminate one speaker chirp from another. However, for clarity the disclosure below focuses on the processing of a signal for one speaker.

Proceeding to block 1104, a microphone such as one of the microphones described above (e.g., the MEMS microphones 313, 812 of FIGS. 3 and 8), which may be substantially co-located with the emitting speaker or which may even be established by the US speaker itself, receives a return signal representing the reflection of the test chirp from a surface against which the test chirp impinges. The surface is assumed to be a wall of the room in which the system is disposed, but as discussed further below, the logic can account for the possibility that the surface is something other than a wall of the room, e.g., is furniture in the room. The signal from the microphone is sent to an appropriate one of the above-described processors, for example, which records the time the return or echo was received. The difference Δt between time of return detection and time "i" of chirp transmission is determined and at block 1106 converted to an $i^{th}$ distance using, for example, the following algorithm: $i^{th}$ distance=½t*c, where c=speed of sound.

At block 1108 the $i^{th}$ distance is stored and associated with the orientation (azimuth and elevation angle of the sonic axis) of the emitting speaker. Moving to decision diamond 1110, it is determined whether any further measurements are to be taken. In an example, 100 mapping measurements be taken (i.e., "i" increases monotonically from one to one hundred). More or fewer measurements may be used. If more measurements are to be taken, the process moves to block 1112 to the next "i", in which the sonic axis of the test emission speaker is oriented at a different elevation and/or azimuth and then the process loops to block 1100.

When all measurements have been taken, the process exits decision diamond 1110 to block 1114 to construct a map of the room. To do this, walls are assumed to be located at respective distances "i" from the location of the emitting speaker and/or microphone (which may be co-located with the speaker) along the respective $i^{th}$ orientations. The walls are assumed to form a regular enclosure, so that any discontinuities such as a relatively short distance recorded between two relatively longer and equal distances can be removed from the map on the assumption that such discontinuities are not walls but rather caused by an artifact such as an intervening piece of furniture or false return.

Once the room dimensions are known, the processor that orients the US speakers as described above knows from the control signal the location at which audio effects are modeled to come and/or be delivered to, and through triangulation determines a reflection location at which to aim the US speaker so that the reflected sound from the reflection location is received at the intended location in the room. In this manner the US speaker may not be aimed directly at the intended player but instead may be aimed at the reflection point, to give the intended player the perception that the sound is coming from the reflection point and not the direction of the US speaker.

The above methods may be implemented as software instructions executed by a processor, including suitably configured application specific integrated circuits (ASIC) or field programmable gate array (FPGA) modules, or any other convenient manner as would be appreciated by those skilled in those art. Where employed, the software instructions may be embodied in a device such as a CD Rom or Flash drive or any of the above non-limiting examples of computer memories that are not transitory signals. The software code instructions may alternatively be embodied in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein.

What is claimed is:

1. A system comprising:
at least one ultrasonic speaker configured to emit sound along a respective sonic axis;
at least one microphone; and
at least one computer memory that is not a transitory signal and that comprises instructions executable by at least one processor to:
generate, using the at least one ultrasonic speaker and the at least one microphone, a map of a room;
receive a control signal; and
responsive to the control signal, actuate a speaker at least in part using the map of the room, wherein the control signal indicates a demanded sonic axis including an elevation component and an azimuth component.

2. The system of claim 1, comprising the processor.

3. The system of claim 1, wherein the control signal is received from a computer game console outputting a main audio channel for playing on non-ultrasonic speakers.

4. The system of claim 1, wherein the control signal represents at least one audio effect data in a received audio channel.

5. The system of claim 4, wherein the audio effect data is established at least in part from input to a computer game input device.

6. A system comprising:
at least one ultrasonic speaker configured to emit sound along a respective sonic axis;
at least one microphone; and at least one computer memory that is not a transitory signal and that comprises instructions executable by at least one processor to:

generate, using the at least one ultrasonic speaker and the at least one microphone, a map of a room;

receive a control signal; and responsive to the control signal, actuate a speaker at least in part using the map of the room, wherein the instructions are executable to, using the map, direct sound at a reflection location responsive to the control signal.

7. A method comprising:

orienting at least one ultrasonic (US) speaker in azimuth and elevation at an ith orientation;

causing the US speaker to emit a mapping sound at a time "i";

detecting a return signal of the mapping sound using at least one microphone;

determining a time difference Δt between time of return signal detection and the time "i";

converting the time difference Δt to an ith distance using:

ith distance=½Δt*c, wherein c=speed of sound;

establishing a location of a surface to be a distance equal to the ith distance associated with the ith orientation;

based at least in part on the location of the surface and responsive to a control signal for a demanded audio effect, establishing an orientation of at least one US speaker at which the at least one US speaker is to emit the demanded audio; and eliminating any detections of reflections of plural of "N" mapping sounds constituting a discontinuity from a map of a room generated using detections of reflections of plural of the "N" mapping sounds.

8. The method of claim 7, comprising using plural US speakers to emit respective mapping sounds at respective frequencies different from each other.

9. The method of claim 7, wherein the microphone is a micro electro-mechanical system (MEMS) microphone.

10. The method of claim 7, wherein the microphone is substantially co-located with the US speaker.

11. The method of claim 7, comprising emitting "N" mapping sounds at times i=1 to N along respective speaker orientations i=1 to N.

12. The method of claim 11, comprising establishing an electronic map of a room using detections of reflections of plural of the "N" mapping sounds.

13. A device comprising:

at least one computer memory that is not a transitory signal and that comprises instructions executable by at least one processor to:

generate, using at least one ultrasonic (US) speaker and the at least one microphone, a map of a room at least in part by:

orienting the at least one US speaker in azimuth and elevation at an ith orientation;

causing the US speaker to emit a mapping sound at a transmission time;

detecting, at a return signal time, a return signal of the mapping sound using the at least one microphone;

determining an ith distance using return signal time and the transmission time; and establishing a location of a surface of the room to be a distance equal to the ith distance associated with the ith orientation.

14. The device of claim 13, wherein the instructions are executable to:

cause plural US speakers to emit respective mapping sounds at respective frequencies different from each other.

15. The device of claim 13, wherein the microphone is a micro electro-mechanical system (MEMS) microphone.

16. The device of claim 13, wherein the instructions are executable to:

cause the at least one US microphone to emit "N" mapping sounds at respective times i=1 to N along respective speaker orientations i=1 to N.

17. The device of claim 16, wherein the instructions are executable to:

establish the map of the room using detections of reflections of plural of the "N" mapping sounds.

18. The device of claim 13, wherein the instructions are executable to:

receive a control signal; and responsive to the control signal, actuate a speaker among the plural ultrasonic speakers at least in part using the map of the room.

* * * * *